United States Patent
Klockar

(10) Patent No.: US 8,583,122 B2
(45) Date of Patent: Nov. 12, 2013

(54) PARALLEL TRANSMISSION OF HANDOVER MESSAGE

(75) Inventor: Lars Klockar, Solna (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 176 days.

(21) Appl. No.: 12/518,393

(22) PCT Filed: Feb. 8, 2007

(86) PCT No.: PCT/SE2007/050080
§ 371 (c)(1),
(2), (4) Date: Jun. 9, 2009

(87) PCT Pub. No.: WO2008/097149
PCT Pub. Date: Aug. 14, 2008

(65) Prior Publication Data
US 2010/0151860 A1    Jun. 17, 2010

(51) Int. Cl.
*H04W 36/00* (2009.01)

(52) U.S. Cl.
USPC ............ 455/438; 455/436; 455/440

(58) Field of Classification Search
USPC .......... 455/434, 438, 437, 439, 435.1, 436, 455/443, 440, 441, 442, 444, 446, 447, 448, 455/449, 450, 517, 524, 525; 370/328, 329, 370/331, 332, 333, 334
See application file for complete search history.

(56) References Cited

U.S. PATENT DOCUMENTS

| | | | |
|---|---|---|---|
| 5,182,753 A | 1/1993 | Dahlin et al. | |
| 5,966,657 A * | 10/1999 | Sporre | 455/425 |
| 5,995,501 A * | 11/1999 | Jung et al. | 370/350 |
| 6,697,422 B1 | 2/2004 | Mathai | |
| 6,810,252 B1 * | 10/2004 | Kwon | 455/436 |
| 7,260,398 B2 * | 8/2007 | Igarashi et al. | 455/436 |
| 7,545,769 B2 * | 6/2009 | Lin | 370/328 |
| 8,031,673 B2 * | 10/2011 | Craig et al. | 370/331 |
| 2004/0095953 A1 | 5/2004 | Bellier et al. | |
| 2007/0167165 A1 * | 7/2007 | Yang et al. | 455/439 |

FOREIGN PATENT DOCUMENTS

EP    0471656 B1    5/1999

* cited by examiner

*Primary Examiner* — George Eng
*Assistant Examiner* — Hung Du
(74) *Attorney, Agent, or Firm* — Rothwell, Figg, Ernst & Manbeck, P.C.

(57) ABSTRACT

In a method and system handover commands to a mobile station supporting simultaneous reception on two different channels is transmitted both on the regular channel and on an additional channel. By supporting decoding of both handover commands in the mobile station the likelihood of a successful handover is greatly increased.

8 Claims, 5 Drawing Sheets

PARALLEL TRANSMISSION OF HANDOVER MESSAGE

CROSS REFERENCE TO RELATED APPLICATION

This application is a 35 U.S.C. §371 National Phase Application from PCT/SE2007/050080, filed Feb. 8, 2007, and designating the United States.

TECHNICAL FIELD

The present invention relates to a method and a system for handling handover in a radio network system in particular a GSM radio system.

BACKGROUND

GSM (Global System for Mobile communications) is a standard for mobile telephony. GSM differs significantly from its predecessors in that both signaling and speech channels are digital, which means that it is seen as a second generation (2G) mobile phone system. GSM is an open standard which is developed by the 3GPP.

As the GSM standard continues to develop, it retains backward compatibility with the original GSM mobile telephones; for example, packet data capabilities were added in the Release '97 version of the standard, by means of General Packet Radio Service (GPRS). Higher speed data transmission has also been introduced with Enhanced Data rates for GSM Evolution (EDGE) in the Release '99 version of the standard.

In release 7 of the 3GPP specifications a downlink dual carrier is introduced. The downlink dual carrier GSM EDGE Radio Access Network (GERAN) makes it possible for the mobile station to receive data on two different frequencies simultaneously. The reason for adding a new downlink carrier is to increase the peak throughput for Enhanced GPRS (EG-PRS). The second carrier enables the mobile station to receive twice as many time slots as with a conventional Enhanced GPRS (EGPRS) system.

The GSM standard is a cellular radio network standard. A cell is an area served by a base station to which a mobile station connects. When the mobile station travels outside the area served by a particular base station, the mobile station must be served by another base station serving another, adjacent cell. In order for the system to handle the transfer from one cell to another a handover procedure is defined for each GSM system.

The handover procedure is a critical phase for the end-user in a GSM network. The handover procedure is used to control the mobile stations in a GSM network. The handover procedure measures the signal strength of a current serving cell and at least one surrounding cell. The results of these measurements are then reported back to the network. If the current serving cell is determined to be inferior to another cell, the target cell, the network initiates a handover from the current serving cell to the target cell, which upon completion of the handover becomes the new serving cell.

The handover procedure is typically initiated when the signal strength in the serving cell is worse than that of another adjacent cell. At this time it is not uncommon that the quality on the speech channel has degraded and that there can be problems for a control signal indicating a change of cell to reach the mobile station. It is necessary for all signaling in a handover procedure to reach the designated mobile station in order for the connection to continue. If the mobile station has traveled out of range for the signaling from the serving cell the connection will be terminated and the call will be dropped once the mobile station travels from the serving cell and is out of reach for the base station of the serving cell. A lot of efforts are therefore spent in a radio network to ensure that this signaling is successful to as large extent as possible.

The handover procedure becomes even more critical in networks dimensioned for speech version 3. The robustness of the speech and the associated control channels are unbalanced for this speech version. This will not result in any major problems as long as it is used to enhance the speech quality. However, if it is used to extend the service area for a cell the likelihood of dropped calls due to signaling failure on the associated control channels is increased as described above.

Thus, there is a problem in existing GSM networks when the MS has moved too far into a target cell before the handover command is sent. In that case it might be very hard for the MS to successfully decode it, which in turn will lead to a call being dropped. This is especially a problem were low AMR modes are used to extend the service area for Circuit Switched (CS) speech.

Hence, there exist a need for a method and a system that is able to increase the robustness of the handover procedure in a GSM network. A more stable handover procedure would also make the frequency planning less critical in non-AMR networks.

SUMMARY

It is an object of the present invention to overcome or at least reduce some of the problems associated with existing handover procedures.

It is another object of the present invention to provide a method and a system that is capable of increasing the likelihood of a successful handover without introducing complex handover procedures such as soft handover and the like.

It is yet another object of the present invention to provide a handover procedure that enables the handover procedure to remain unchanged and at the same time increase the likelihood of a successful handover.

These objects and others are obtained by the method and system as set out in the appended claims. Thus, by transmitting the handover command to the mobile station both on the regular carrier and on an additional carrier and decoding both handover commands in the mobile station the likelihood of a successful handover is greatly increased. In particular the downlink dual link carrier introduced in release 7 of the 3GPP is advantageously employed as a second downlink carrier for transmission of a parallel handover command.

The handover procedure is thus extended for mobile stations that support dual carrier in downlink by sending the handover command on two different carriers. The additional handover command sent on the second channel can advantageously be transmitted from the intended target cell or the serving cell. However, in some scenarios it might prove advantageous to transmit the additional handover command from a location other than the serving cell or the target cell, such an adjacent base station serving a cell other than the serving cell or the target cell.

In a typical set-up the serving cell and target cell will simultaneously send the same handover command to the mobile station, but on different frequencies. The difference in quality of the two channels can be rather large and the probability of a successful decoding is therefore increased substantially.

In order for the transmission of parallel handover commands to be useful the mobile station needs to be enabled to simultaneously decode both handover commands. Thus, the mobile station needs to have knowledge of the channel used by the system for transmission of the second, additional handover command. This can be accomplished in a number of different ways.

Thus, prior to the handover the Base Station Subsystem (BSS) provides the mobile station with information about the second handover signaling channel. When the mobile station receives a handover command on any of the downlink signaling channels it initiates a handover procedure in a conventional manner. There is no need to provide support for the Dual Carrier on the uplink. The channel in the target cell that is used for sending the handover command does not need to be the same channel as the one specified in the handover command, i.e. the channel to which the mobile station is to be handed over to.

BRIEF DESCRIPTION OF THE DRAWINGS

The present invention will now be described in more detail by way of non-limiting examples and with reference to the accompanying drawings, in which.

DETAILED DESCRIPTION

Figure 1:
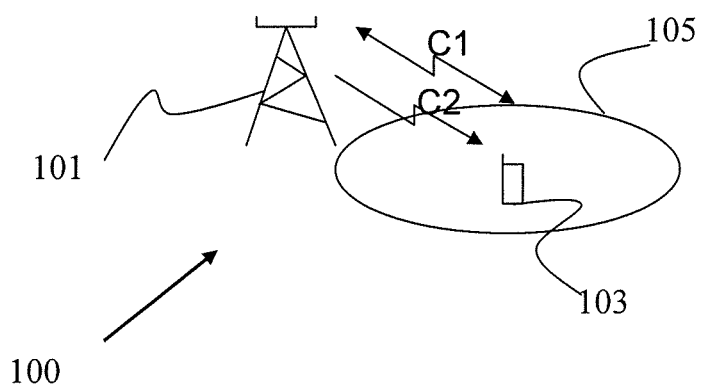
FIG. 1 is a view illustrating handover in accordance with the invention.

In FIG. 1 a view illustrating transmission of a handover command in accordance with the present invention in a GSM radio system 100 is shown. The GSM radio system comprises a number of cells each served by a base station as is well known in the art. For illustration purpose, only one cell 105 is shown in FIG. 1.

A mobile station 103 being served by a base station 101 in the cell 105 will at some point in time travel towards the boundary of the cell 105 which will be detected by the GSM system 100. Typically the detection is made by comparing the signal strength in the serving cell to that of other adjacent cells. Upon detection the base station subsystem will initiate a handover command.

In order to increase the likelihood of a successful reception and decoding of the handover command the base station subsystem will transmit the handover command on two different carriers (C1 and C2). In accordance with a first preferred embodiment the base station subsystem will transmit the handover command on a carrier C2 from the same location as the first Carrier (C1), i.e. from the serving base station as shown in FIG. 1.

Figure 2:
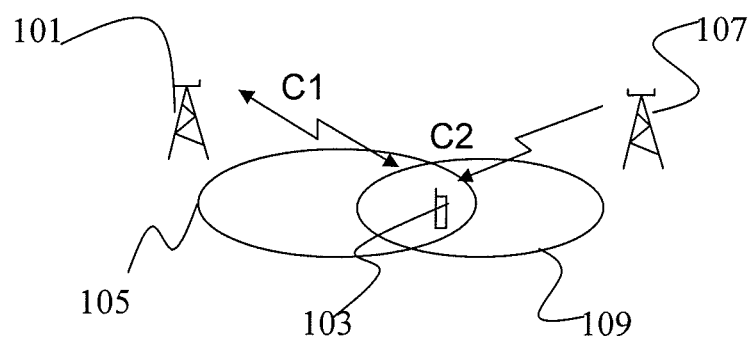
FIG. 2 is a view illustrating handover in accordance with another embodiment of the invention.

In FIG. 2 transmission in accordance with another embodiment of the present invention is illustrated. A mobile station 103 being served by the base station 101 in the cell 105 will at some point in time travel towards the boundary of the cell 105 which will be detected by the GSM system 100. Typically the detection is made by comparing the signal strength in the serving cell to that of other adjacent cells. Upon detection the base station subsystem will initiate a handover command.

In order to increase the likelihood of a successful reception and decoding of the handover command the base station subsystem will transmit the handover command on two different carriers (C1 and C2). In accordance with a second preferred embodiment the base station subsystem will transmit the handover command on a carrier C2 from a base station 107 to which the mobile station is to be handed over to, i.e. from the target base station 107 as shown in FIG. 2.

Figure 5:
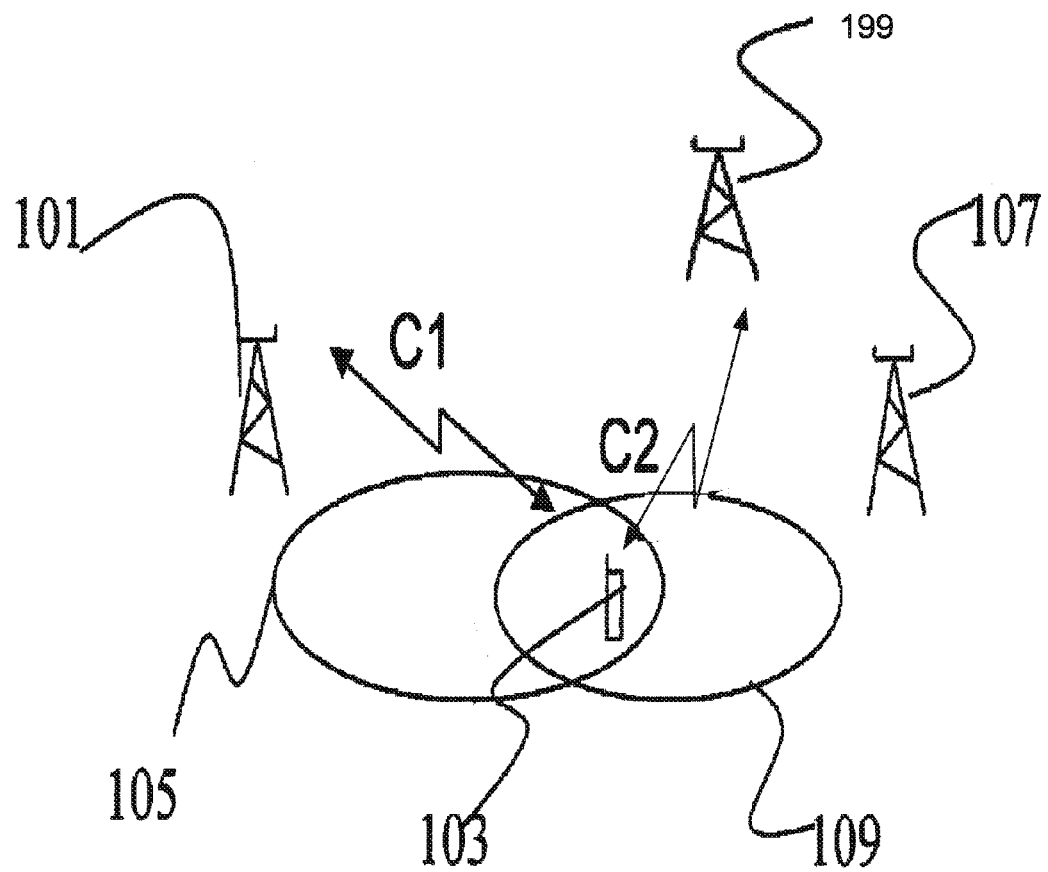
FIG. 5 is a view illustrating handover in accordance with another embodiment.

In yet another, third embodiment of the present invention the duplicated second handover command transmitted on the second carrier is transmitted from another than the base station 101 of the serving cell or the base station 107 of the target cell, as illustrated in FIG. 5, which shows the duplicated handover command being transmitted by the another base station 199. The additional handover command can then be transmitted from a radio transmitter covering the area where the mobile station is located and controlled by the radio system. The radio transmitter used for such a purpose can for example be a base station of a cell other than the serving cell or the target cell or any other suitable radio transmitter In order for the mobile station to have information on which radio channel the additional handover command is to be transmitted, such information must be provided to the mobile station.

The information relating to the additional channel could be distributed in a number of different ways. For example the information can be transmitted directly at the call set-up or at establishment of the main signaling link. This is described in the flow chart in FIG. 3.

Figure 3:
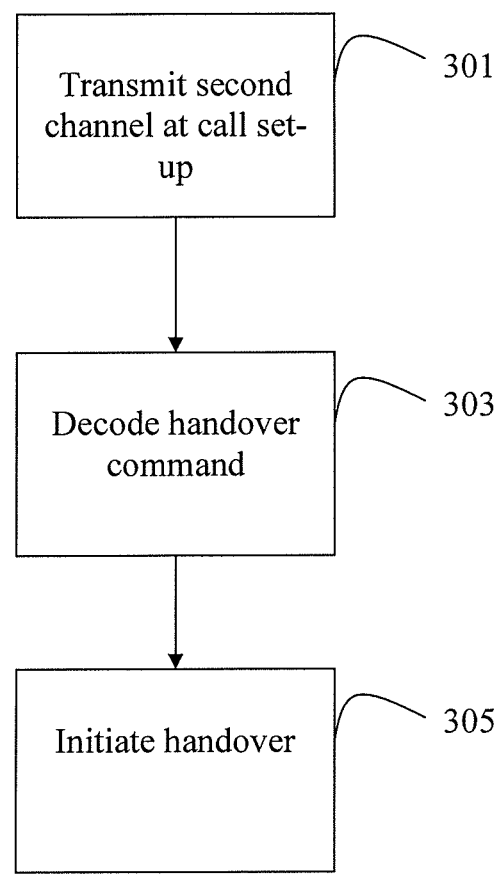
FIG. 3 is a flow chart illustrating different steps performed when transmitting a handover command.

In FIG. 3 a flow chart illustration steps performed in a GSM radio system designed to transmit the handover command in parallel on two different channels is shown. First in a step 301, at call set-up, the base station subsystem transmits a message including data defining the channel to be used as the second handover command channel to the mobile station. Next, the mobile station decodes the message and starts to monitor the assigned frequency in parallel with the frequency on which the call takes place, step 303.

Upon detection of a handover command on either of the two frequencies the mobile station acknowledges the receipt of the handover command and initiates handover in accordance with the parameters provided by the handover command, step 305.

In another example, a new message on the Slow Associated Control Channel (SACCH) could be used to distribute the information about the second handover signaling channel in target cell. This new message should preferably not be sent too often on the SACCH. In a preferred embodiment the message is only sent when the mobile station is determined to be close to the cell border. One reason to chose the SACCH as the channel on which to send information relating to the additional channel is that the information that is sent there is not very time critical. Thus, the information sent on this channel is system information and also information relating to which output power and timing advance that should be used for the uplink.

Figure 4:
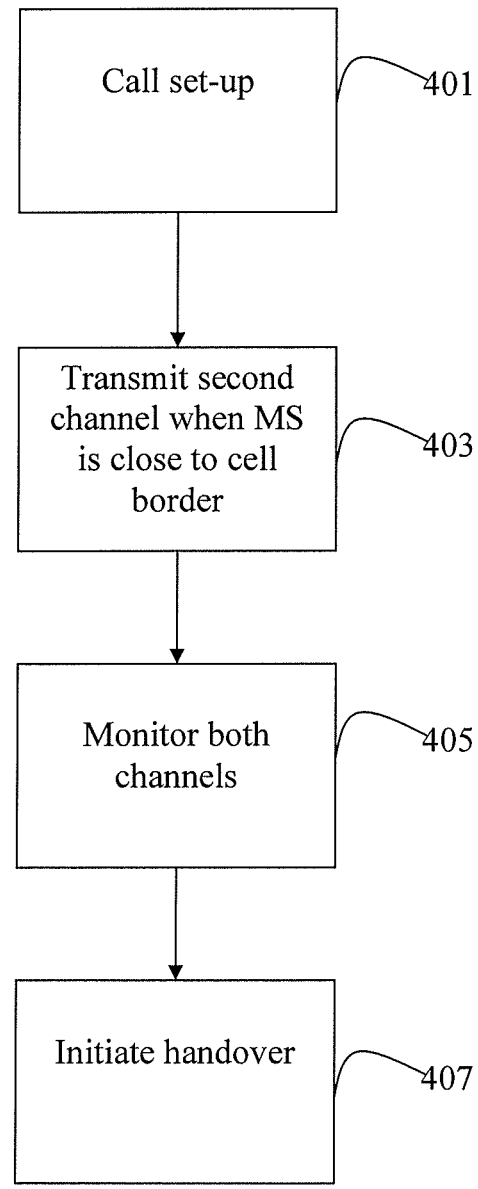
FIG. 4 is a flow chart illustrating different steps performed when transmitting a handover command in accordance with another embodiment of the invention.

In FIG. 4, a flow chart illustration steps performed in a GSM radio system designed to transmit the handover command in parallel on two different channels in accordance with such an alternate procedure is shown. First in a step 401, at call set-up, the base station subsystem transmits conventional control signals to the mobile station. When the base station subsystem detects the mobile station is close to the border of the cell it transmits information regarding a second channel for the mobile station to monitor, step 403. Next, the mobile station decodes the message and starts to monitor the assigned frequency in parallel with the frequency on which the call takes place, step 405.

Figure 6:
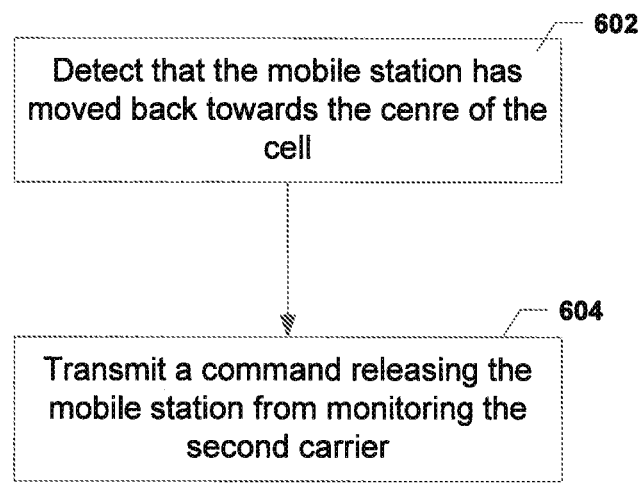
FIG. 6 is a flow chart illustrating a process according to some embodiments.

Upon detection of a handover command on either of the two frequencies the mobile station acknowledges the receipt of the handover command and initiates handover in accordance with the parameters provided by the handover command, step 407. If at any time when the mobile station is in a mode where two channels are monitored simultaneously for handover commands, the base station detects that the mobile station has moved back towards the centre of the cell (see FIG. 6, step 602) it can issue a command (see FIG. 6, step 604) releasing the mobile from monitoring the second handover command channel.

Furthermore, the second handover signaling channel could either be allocated only for the mobile station involved in the enhanced handover procedure or alternative be a channel that is used by all mobile stations that are capable of employing the handover procedure as described herein. Alternatively a busy channel could be used and if the channel is busy with an ongoing speech connection a number of speech frames will be omitted in order to transmit the handover command. Hence, in such an embodiment speech frames will be omitted for another user when distributing handover command to the mobile station.

By using the method and system as described herein and transmitting the handover command to a mobile station supporting simultaneous reception on two different channels both on the regular channel and on an additional channel and supporting decoding of both handover commands in the mobile station the likelihood of a successful handover is greatly increased.

The invention claimed is:

1. A method of transmitting a handover command to a mobile station that is using a first carrier to send or receive data from a serving base station that serves a cell, the method comprising:
   (a) determining that the mobile station is approaching the boundary of the cell;
   (b) in response to determining that the mobile station is near the boundary of the cell, transmitting to the mobile station a message that causes the mobile station to begin monitoring a second carrier;
   (c) after performing step (b), determining that a handover command should be transmitted to the mobile station; and
   (d) in response to the determination that the handover command should be transmitted to the mobile station, performing the following steps:
   (d1) transmitting the handover command from the serving base station to the mobile station on the first carrier; and
   (d2) transmitting the same handover command to the mobile station on the second carrier that is at a different frequency than the first carrier, wherein the handover command transmitted on the second carrier is transmitted from a third base station, which is different than the serving base station and a target base station.

2. The method according to claim 1, wherein the message is transmitted using a Slow Associated Control Channel (SACCH).

3. The method according to claim 1, wherein the handover command transmitted on the second carrier is transmitted on a channel being busy with an ongoing speech connection by omitting a number of speech frames in order to transmit the handover command.

4. The method according to claim 1, further comprising: after performing step (b), transmitting a command from the serving base station releasing the mobile station from monitoring the second carrier in response to detecting that the mobile station has moved back towards the center of the cell.

5. A base station subsystem comprising:
   a first base station operable to serve a mobile station in a serving cell using a first carrier; and
   a second base station, wherein
   the base station subsystem is configured such that,
   (a) in response to a determination that the mobile station is approaching the boundary of the serving cell, the base station subsystem transmits to the mobile station a message that causes the mobile station to monitor a second carrier that has a different frequency than the first carrier, and (b) in response to the first base station determining that a handover command should be sent to the mobile station, the base station subsystem transmits two of the same handover commands to the mobile station, a first handover command and a second handover command, wherein
   the first handover command is transmitted, from the first base station, to the mobile station on the first carrier, and
   the second handover command is transmitted to the mobile station on the second carrier that has a different frequency than the first carrier, wherein
   the base station subsystem comprises a third base station, which is different from the first base station and the second base station, wherein
   the first base station is the serving base station and the second base station is a handover target base station, and
   the base station subsystem is configured such that the second handover command is transmitted from the third base station.

6. The base station subsystem according to claim 5, wherein the base station subsystem is configured such that the message is transmitted to the mobile station on a Slow Associated Control Channel (SACCH).

7. The base station subsystem according to claim 5, wherein the base station subsystem is configured such that the second handover command is transmitted on a channel being busy with an ongoing speech connection by omitting a number of speech frames in order to transmit the handover command.

8. The base station subsystem according to claim 5, wherein the base station subsystem is configured such that, in response to a determination that the mobile station has moved back towards the center of the serving cell, during a time in which the mobile station is monitoring the second carrier, the base station subsystem transmits to the mobile station a command releasing the mobile station from monitoring the second carrier.

* * * * *